United States Patent Office.

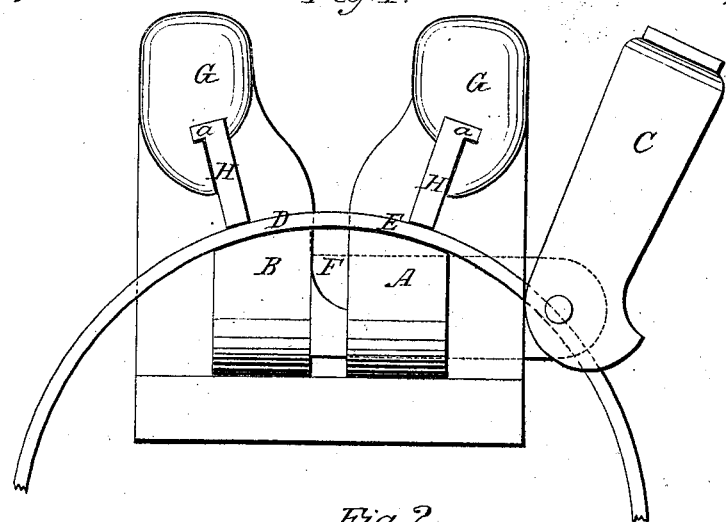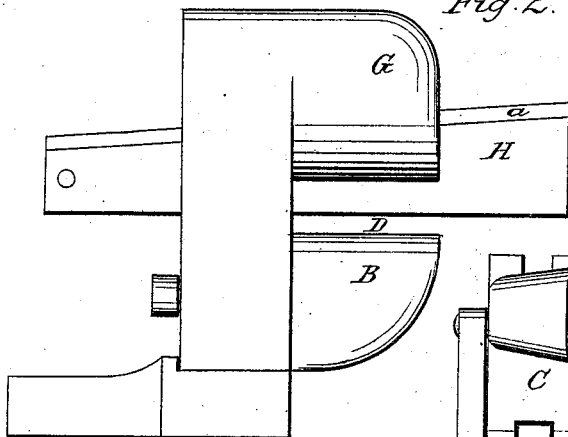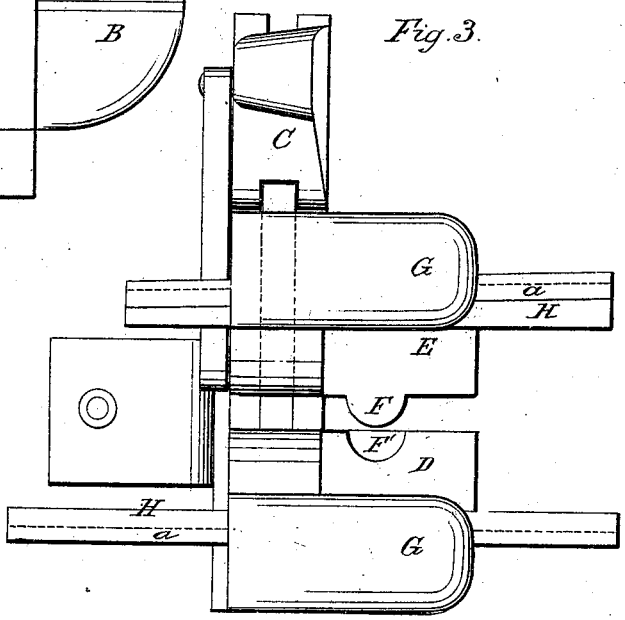

ALBERT S. HART, OF SAN FRANCISCO, CALIFORNIA.

Letters Patent No. 98,057, dated December 21, 1869.

IMPROVED MACHINE FOR UPSETTING TIRE.

The Schedule referred to in these Letters Patent and making part of the same.

*To all whom it may concern:*

Be it known that I, ALBERT S. HART, of the city and county of San Francisco, State of California, have invented an Improved Band and Tire-Upsetting Machine; and I do hereby declare the following description and accompanying drawings are sufficient to enable any person skilled in the art or science to which it most nearly appertains, to make and use my said invention or improvements, without further invention or experiment.

My invention relates to certain new and useful improvements in machines for shrinking or upsetting the tires of wheels, but more particularly of small bands; and It consists in providing the two jaws, which retain the band or tire, with a projecting head, so that when the band is keyed to the machine, the wedge will have an equal bearing the entire width of the band or tire.

The wedges themselves are so arranged in a slot in the jaws, that as they are withdrawn, they are gradually raised, so as to free the band and present no obstacle, to prevent the ready introduction of the next heated tire.

Attached to the fixed jaw is a projection, which fits in a suitable opening in the movable jaw, when they are closed, and which prevents the band from buckling or bending down, during the process of shrinking.

A better understanding of my invention can be had by referring to the accompanying drawings, forming a part of this specification, in which—

Figure 1 is a front view.
Figure 2 is a side view.
Figure 3 is a top view.

A is the fixed, and B, the movable jaws of a tire for band-upsetting machine, the two being drawn together by means of a lever, C, the attached end of which is formed into an eccentric, so that by lowering the lever, the jaws are closed.

The band or tire to be upset is placed upon the curved faces D and E of the two jaws, as shown in red, fig. 1.

Directly beneath the tire, on the fixed jaw, is a projection, F, which, when the jaws are closed, fits into a corresponding recess, F', in the movable jaw, so as to form a connection between the two jaws, which prevents the band from buckling or bending downward, when the pressure is on it.

Above the bed, upon which the band or tire is placed, are two projecting heads, G G, one attached to each jaw.

Wedges H H pass through slots in these heads, transversely to the band or tire, so that when they are driven through, they will bear down upon the tire, and hold it in place.

The heads G G project out over the tire sufficiently to give a bearing for the wedges the entire width of the tire, so that the strain will be equally distributed, thus obviating the necessity of having bearings on both sides, for the wedges to pass through.

The heads are placed far enough apart to admit the stroke of a hammer, which will be necessary, should the band buckle or bend upward under the strain.

The wedges H are provided with a flange, $a$, at their upper side, standing at right angles to the wedge itself, and which moves in a corresponding slot in the upper portion of the slot in which the wedge moves, thus causing the flange to gradually raise the wedge when it is withdrawn, and depress it, as it is driven in. This is necessary, in order that no obstacle shall be in the way of immediately placing the band or tire, after it is heated, upon the bed, to which it is confined for shrinking, as bands especially become cooled very quickly, after being removed from the fire, owing to the thinness of the metal of which they are made.

Having thus described my invention,

What I claim as new, and desire to secure by Letters Patent, is—

1. The arrangement, relatively to each other, of the several parts of the above-described machine, substantially as set forth.

2. In combination with the faces D and E, and the projecting heads G, the wedges H, when provided with a flange, $a$, fitting in a groove, whereby the wedges are lifted clear of the faces, when drawn back, so as to leave a clear space to receive the tire, substantially as described.

In witness whereof, I have hereunto set my hand and seal.

ALBERT S. HART. [L. S.]

Witnesses:
GEO. H. STRONG,
J. L. BOONE.